Figure 1:
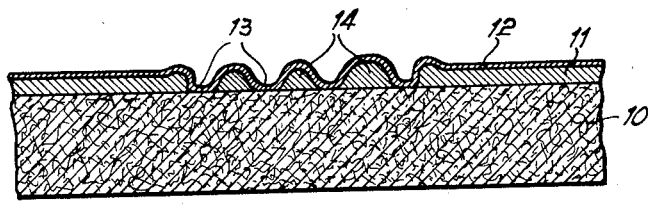

April 26, 1960    H. MAYLANDT ET AL    2,934,687
SELF-HEALING CAPACITOR
Filed May 3, 1956

INVENTORS:
Helmut Maylandt and
Eberhardt Traub
By: Michael S. Striker
agt.

2,934,687
SELF-HEALING CAPACITOR

Helmut Maylandt, Plochingen, and Eberhardt Traub, Stuttgart, Germany, assignors to Robert Bosch G.m.b.H., Stuttgart, Germany Application May 3, 1956, Serial No. 582,519

Claims priority, application Germany May 6, 1955

2 Claims. (Cl. 317—258)

The present invention relates to a self-healing capacitor, and more particularly it relates to a capacitor which is not only self-healing at the pin holes caused by breakdowns, but also at points at which undue local heating occurs for instance due to increased electrical losses in operation with alternating current.

It has been found that particularly in capacitors operating with alternating current, the temperature may rise at individual points to such an extent that the dielectric is for instance carbonized and the capacitor then destroyed by the pressure of gases formed by the destruction of the dielectric body. In order to prevent destruction of the capacitor by gas pressure it has been attempted to cover at least one face of the dielectric body with a coating which upon heating will tear and thus prevent harmul decomposition or other destruction of the dielectric body.

Metal alloys with low melting points have been found best suited for forming the coating which will tear open upon breakdown or local overheating of the dielectric body. When such overheating or breakdown and consequently tearing open of the metal alloy coating occurs, the electric field is interrupted at the point of breakdown or overheating and thereby to some extent further overheating at this point is avoided. However, it has been found that the use of a low melting metal alloy notwithstanding further overheating and consequent destruction of the capacitor may occur since in many cases the electric field at the point of breakdown or overheating disappears only temporarily or is only insufficiently reduced to prevent further damage.

It is therefore an object of the present invention to overcome the above-described disadvantages of self-healing capacitors.

It is a further object of the present invention to provide a self-healing capacitor in which points at which a breakdown or overheating has occurred will be permanently and completely insulated.

It is yet another object of the present invention to provide a self-healing capacitor in which destruction such as carbonization of the dielectric body will be prevented.

It is still another object of the present invention to provide a self-healing capacitor which can be continuously operated without being substantially harmed by localized breakdowns or overheating.

Other objects and advantages of the present invention will become apparent from a further reading of the description and the appended claims.

With the above objects in view, the present invention mainly comprises in a self-healing capacitor, in combination, a body of material having a high dielectric constant, and a low melting metal alloy coating on at least one face of the body, the metal alloy consisting essentially of at least three metals, the melting temperature at which the metal alloy starts to melt being substantially determined by at least two of the metals, and at least one of the other of the metals not substantially affecting the melting temperature and being more easily oxidizable than the metals which determine the melting temperature, the oxidation product of the other of the metals having a higher electrical resistance than the oxidation products of the metals which determine the melting temperature, so that upon breakdown of the capacitor or undue localized heating thereof, self-healing of the capacitor takes place at the point of breakdown or undue localized heating with a layer of the oxidation product of the other of the metals covering and insulating the point and thereby permitting continued operation of the capacitor.

It has been found according to the present invention that complete disappearance of the electric field at points of strong local heating occurs only if the specific surface resistance of the coating which covers these points after the thermic tearing-open or bursting of the metal alloy coating is sufficiently great.

The term "specific surface resistance" as used in the present application has the following specific meaning:

Specific surface resistance denotes the electrical resistance which can be measured in the area where the metal alloy coating has been torn open. It is measured between two straight edges which are so positioned on a strip of constant width in a direction normal to the parallel borders of the strip, that the length of each edge which is in contact with the strip as well as the distance of the edges from each other in the longitudinal direction of the strip are equal to the width of the strip. Thus the length of the measured area is equal to its width and the measured area is therefore of square shape. Consequently the result of measuring electrical resistance between the two edges is independent of the length of the sides of the square and the thus obtained result has a dimension of "ohm."

Generally it is necessary for complete disappearance of the electric field that a specific surface resistance of more than $10^6$ ohms is obtained. Such increase in the resistance of the covering cannot be obtained by using for the coating any metal alloy, the melting temperature of which is below the temperature of destruction of the employed dielectric. A satisfactory permanent interruption of the electric field at the points of faults can only be achieved if between the metal islands formed upon tearing open of the alloy coating not only no alloy bridges remain but if also in addition the always present corrosion layer on the metal alloy coating has a sufficiently high electrical resistance to prevent formation of an electrical field.

According to the present invention a low melting alloy is used as a covering which coating may be thermically torn open and which alloy in addition to the components controlling the temperature at which the tearing-open occurs, also includes a further component which causes the formation of a corrosion or surface layer on the surface of the metal covering of greater specific surface resistance than the surface resistance of a corrosion layer which would have been formed on an alloy consisting only of those components which control the temperature at which tearing-open of the coating will occur. Such an alloy may for instance consist of cadmium, bismuth and zinc in a composition containing more than 5% cadmium, between 2 and 80% bismuth and between 2 and 80% zinc, and in which the required high resistance of the corrosion surface layer is achieved by the zinc content of the alloy. The temperature at which tearing-open will occur in a cadmium bismuth zinc alloy is solely controlled by the melting point of the eutectic mixture of the components cadmium and bismuth. Since, however, the presence of cadmium in an alloy consisting exclusively of cadmium and bismuth would lead to corrosion layers which have a relatively low specific electric resistance as measured in ohms, the torn up cadmium bismuth layers would not reach the above-referred-to limit of $10^6$ ohms.

However, if such low melting coating contains in addition to cadmium and bismuth also zinc, then on the surface of this coating instead of a surface layer of cadmium corrosion products a surface layer of corrosion products the baser zinc is formed which zinc oxide layer possesses a considerably higher electrical resistance than the corrosion layers formed of cadmium. This is the reason why through torn open layers of cadmium-bismuth-zinc alloys practically no passage of electric current can take place and consequently the layer at this point does no longer represent a capacitor coating.

Good results are obtained according to the present invention when alloys are employed which are composed of more than 30% cadmium, between 5 and 30% bismuth and between 10 and 40% zinc. In practical operation excellent results have been achieved with coating consisting of an alloy comprising 60% cadmium, 20% bismuth and 20% zinc. Such coatings are torn open at 143° C., i.e. before a harmful decomposition of the paper occurs which frequently is used as dielectric body of the capacitor. The specific surface resistance of torn open cadmium-bismuth-zinc coatings amounts to between $10^8$ and $10^{10}$ ohms. It is of course also possible to employ alloys with components other than cadmium and bismuth for controlling the temperature at which tearing open of the coating occurs, such as tin-bismuth, lead-tin and tin-cadmium, when it is intended to form coverings which will be thermically torn open within the temperature range of between 120 and 200° C. The third alloy component has then so to be chosen as in every case to be baser, or more easily oxidized than the components of the alloy which determine the temperature at which tearing open occurs. Thus, the corrosion layer on the surface of the metal alloy coating will have a greater electric resistance than a corrosion layer which would be formed if only the melting temperature controlling components of the alloy were present. As third and baser alloy component, in combination with the above-mentioned alloys which control the temperature at which tearing open of the covering occurs, metals such as aluminum, magnesium, manganese and indium may be employed.

For self-healing capacitors which posses a metal alloy covering according to the present invention which tears open upon heating, one will normally choose for the coating of the other face of the dielectric body a metal layer which is especially suitable for the self-healing of break-down pin holes, that is for instance, a coating which consists of zinc, cadmium, aluminum or nickel and which possesses a thickness of between 0.01 and $0.2\mu$. The coating which tears open upon excessive heating may then be of any desired thickness. It is however also within the scope of the present invention to so choose the thickness of the coating which will tear open upon heating that the same does not only disappear around pin holes caused by breakdowns, thereby interrupting the breakdown current, but the thickness of the coating may also be chosen so as to loose its electric conductivity upon excessive local heating thereby causing disappearance of the electric field at these points. In this case it is possible to use for the coatings of both faces of the capacitor the same metal alloy, or it is also possible to use for the coating of the other face of the capacitor a non-sealing different metal covering for instance a metal foil.

Figure 2:
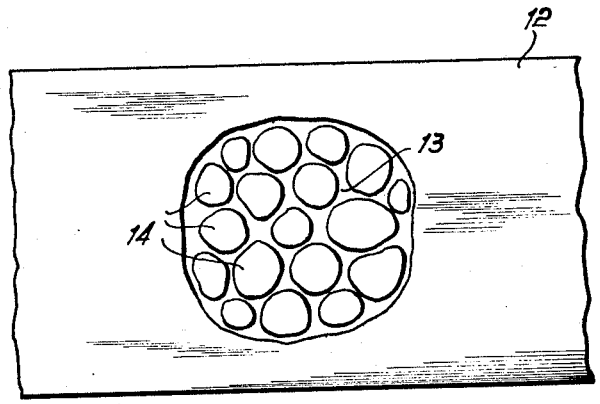

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic cross-sectional view through a dielectric having a torn open covering; and Fig. 2 is a plane view from above of the dielectric and the covering illustrated in Fig. 1.

Referring now to the drawing, a support body 10 of a material having a high dielectric constant and consisting for instance of capacitor paper having a thickness of $8\mu$ is shown, on which a metal alloy coating 11 is metallized, having a thickness of about $0.05\mu$ and consisting of a cadmium-bismuth-zinc alloy. On the surface of metal coating 11 after the metallization a corrosion layer forms which for instance may have a thickness of $0.01\mu$ and which usually consists of metal oxide. The corrosion layer has been omitted from Figure 2 for the sake of clarity. At points 13, the metal layer 12 has been thermically torn open, i.e. the covering alloy has burst or split under the influence of local heating to the melting temperature of the cadmium-bismuth-zinc alloy (143° C.) into numerous small separate islands 14 consisting of a metal alloy coating and not being in contact with each other. In order of size, $10^6$ islands are formed per square millimeter upon bursting of the alloy coating. Investigations under the electron microscope have shown that thereby generally the island formation extends only to the alloy coating underneath the surface or corrosion layer, while the corrosion layer is not torn open but, depending on the metal of which it is formed, remains as a more or less electrically conductive skin over metal islands 14 and the area surrounding the metal islands. By employing a cadmium-bismuth-zinc alloy, this skin consists primarily of zinc oxide which possesses a sufficient great electrical resistance so as to obtain on the torn open surface between the islands a specific surface resistance of more than $10^6$ ohms.

It will be understood that each of the elements described above, or two or more together, may also find a useful application in other types of capacitors differing from the types described above.

While the invention has been illustrated and described as embodied in a self-healing capacitor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a self-healing capacitor, in combination, a body of material having a high dielectric constant; and a low melting metal alloy coating on at least one face of said body, said metal alloy consisting essentially of at least 30% cadmium, between 5 and 30% bismuth and between 10 and 40% zinc, the melting temperature at which said metal alloy starts to melt being substantially determined by said cadmium and said bismuth, said zinc not substantially affecting said melting temperature and being more easily oxidizable than said cadmium and said bismuth, the oxidation product of said zinc having a specific surface resistance of more than $10^6$ ohm being higher than the electrical resistance of the oxidation products of said cadmium and said bismuth, so that upon breakdown of said capacitor or undue localized heating thereof, self-healing of the capacitor takes place at the point of breakdown or undue localized heating with a layer of zinc oxide covering and insulating said point.

2. In a self-healing capacitor, in combination, a body of material having a high dielectric constant; and a low melting metal alloy coating on at least one face of said body, said metal alloy consisting essentially of approximately 60% cadmium, 20% bismuth and 20% zinc, the melting temperature at which said metal alloy starts to melt being substantially determined by said cadmium and said bismuth, said zinc not substantially affecting said melting temperature and being more easily oxidizable than said cadmium and said bismuth, the oxidation product of said zinc having a specific surface resistance of more than $10^6$ ohm, so that upon breakdown of said capacitor or undue localized heating thereof, self-healing of the capacitor takes place at the point of breakdown or undue localized heating with a layer of zinc oxide covering and insulating said point.

References Cited in the file of this patent

FOREIGN PATENTS

| | | |
|---|---|---|
| 903,026 | France | Jan. 5, 1945 |
| 728,566 | Great Britain | Apr. 20, 1955 |